United States Patent [19]

O'Neill

[11] Patent Number: 4,579,936

[45] Date of Patent: Apr. 1, 1986

[54] ETHYLENE TEREPHTHALATE COPOLYMERS

[75] Inventor: George J. O'Neill, Kingsport, Tenn.

[73] Assignee: Eastman Kodak Company, Rochester, N.Y.

[21] Appl. No.: 609,367

[22] Filed: May 11, 1984

[51] Int. Cl.⁴ ............................................. C08G 63/68
[52] U.S. Cl. .................... 528/295; 528/308.6; 528/308.7
[58] Field of Search .................. 528/295, 308.6, 308.7

[56] References Cited

U.S. PATENT DOCUMENTS

| | | | |
|---|---|---|---|
| 3,900,527 | 8/1975 | King et al. | 528/295 |
| 4,104,262 | 8/1978 | Schade | 528/295 |
| 4,390,687 | 6/1983 | Tung | 528/295 |
| 4,427,557 | 1/1984 | Stockburger | 528/295 X |

Primary Examiner—Lucille M. Phynes
Attorney, Agent, or Firm—John F. Stevens; William P. Heath, Jr.

[57] ABSTRACT

An ethylene terephthalate copolymer modified with an alicyclic sulfonate is disclosed which is useful in the production of biaxially oriented containers.

7 Claims, No Drawings

ETHYLENE TEREPHTHALATE COPOLYMERS

DESCRIPTION

TECHNICAL FIELD

The present invention relates to ethylene terephthalate copolymers modified with alicyclic sulfonates, and their use in biaxially oriented containers.

BACKGROUND OF THE INVENTION

Ethylene terephthalate copolymers modified with dimethyl 5-sodiosulfoisophthalate or 5-sodiosulfoisophthalic acid are described in copending U.S. patent application Ser. No. 588,168 filed Mar. 9, 1984, now U.S. Pat. No. 4,499,262 by Fagerburg and McFarlane. These copolymers have a lower "planar stretch ratio" (described hereinafter) than unmodified polyethylene terephthalate at the same inherent viscosity. Thus, a polymer with a lower inherent viscosity can be used for the production of articles such as beverage bottles, and the polymer can be produced at a much faster rate than the unmodified polymer. When the aromatic modifiers are used, however, a buffer such as sodium acetate must be used to limit the formation of uncontrolled amounts of diethylene glycol as a by-product. The presence of sodium acetate (NaOAc) significantly reduces the polymerization rate and serves to offset the economic advantage of using these aromatic modifiers.

In the present invention, the alicyclic sulfonates used as modifiers do not require the use of buffers, and the modified polyethylene terephthalate has acceptable levels of diethylene glycol and acceptable polymerization rate.

The term planar stretch ratio is generally defined as the product of the stretch ratios of each of two directions of stretch (machine direction and transverse direction in film or sheet formation or axial and hoop directions in bottle formation). Thus, for a film stretched three times in each direction (machine and transverse direction or axial and hoop direction) so that the final lengths are three times the initial lengths, the planar stretch ratio would be 3×3 or 9. Critical planar stretch ratio is the planar stretch ratio at the point in the stress strain curve of a material at which strain hardening begins. It is in the design and manufacture of parisons from which containers such as beverage bottles are made that the critical planar stretch ratio is important. Thus, by multiplying the critical planar stretch ratio by the bottle-wall thickness desired the parison thickness necessary to make a bottle having that wall thickness can be determined. It therefore follows that if a material to be used in making parisons can be obtained so as to have a critical planar stretch ratio lower than that previously employed, the parison could be designed thinner and longer. The advantages to the container manufacturing industry in using parisons having thinner walls would be readily apparent. Because heat transfer is known to be directly related to the square of the thickness of the molded article, the time ordinarily required in molding articles will be reduced with the use of thermoplastic material having a lower critical planar stretch ratio. A reduced molding cycle time in turn results in increased productivity and decreased costs for the manufacturer.

While it is known that lower critical planar stretch ratios for certain thermoplastic materials such as poly(ethylene terephthalate) can be achieved by employing a material having a higher inherent viscosity (I.V.), this method is disadvantageous since a longer production rate or a greater number of reactors is required to obtain the desired higher I.V. Moreover, the increased process time makes obtaining a material with acceptable color more difficult since polyester materials are subject to yellowing, the degree of yellowing directly correlated with reaction time. Thus, an alternate means for obtaining thermoplastic materials such as poly(ethylene terephthalate) having a lower critical planar stretch ratio would be advantageous to bottle producers and other containers manufacturers.

DISCLOSURE OF THE INVENTION

According to the present invention, there is provided a modified ethylene terephthalate copolymer having an improved planar stretch ratio at a given inherent viscosity and relatively low diethylene glycol content, the copolymer having repeat units from 100 mol % of a glycol component comprising at least 80 mol % ethylene glycol and from 100 mol % of a dicarboxylic acid component comprising at least 80 mol % terephthalic acid or an ester-forming derivative thereof and about 0.1–5.0 mol % of a compound having a structure selected from

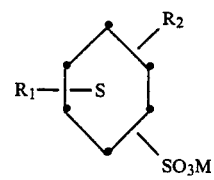

wherein $R_1$ is H, alkyl from $C_1$–$C_8$ or COOR and $R_2$ is COOR and wherein R is H, alkyl from $C_1$–$C_8$ or $O(CH_2)_2OH$ and

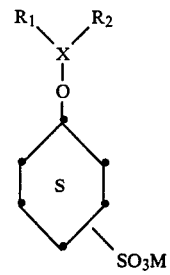

wherein $R_1$ is COOR and $R_2$ is H, alkyl from $C_1$–$C_8$ or COOR and wherein R is H, alkyl from $C_1$–$C_8$ or $O(CH_2)_2OH$ and M in each of the above formulas is an alkali or alkaline earth metal ion.

The term polyethylene terephthalate as used herein includes copolymers thereof. Preferred polyethylene terephthalate useful in preparing the thermoplastic articles of this invention includes (a) polymers wherein at least about 97% of the polymer contains the repeating ethylene terephthalate units of the formula:

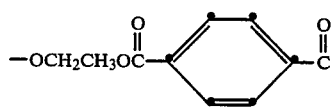

with any remainder being minor amounts of ester-forming components, and (b) copolymers of ethylene terephthalate wherein up to about 85 mol percent of the copolymer is prepared from the monomer units of diethylene glycol; propane-1,3-diol; butane-1,4-diol; polytetramethylene glycol; polyethylene glycol; polypropylene glycol; 1,4-cyclohexanedimethanol; neopentyl glycol and the like substituted for the glycol moiety in the preparation of the copolymer or up to about 20 mol % from monomer units of isophthalic; bibenzoic, naphthalene 1,4- or 2,6-dicarboxylic; adipic; sebacic; decane-1,10-dicarboxylic, diglycolic acid and the like, substituted for the acid moiety in the preparation of the copolymer.

In addition, the polyethylene terephthalate polymer can include various additives that do not adversely affect the polymer in use such as stabilizers, e.g., antioxidants or ultraviolet light screening agents, extrusion aids, additives designed to make the polymer more degradable or combustible, such as oxidation catalyst, as well as dyes or pigments.

The polyethylene terephthalate should have an inherent viscosity (0.5% concentration of polymer in a 40/60 weight percent solution of tetrachloroethane/phenol, respectively, at 25° C.) of at least 0.55 and no greater than about 0.90 to obtain the desired end properties in the articles formed and preferably the inherent viscosity is at least about 0.60 to obtain an article having excellent toughness properties, i.e., resistance to impact loading. Especially preferred polyesters include those in this essentially all of the ester forming components are (1) terephthalic acid and ethylene glycol, or (2) terephthalic acid, at least 15 mol % ethylene glycol and up to 85 mol % 1,4-cyclohexanedimethanol. Such polyesters and their preparation are described in U.S. Pat. No. 3,733,909 which is incorporated herein by reference. These polyesters are also commercially available.

The alicyclic sulfonates represented by the general formulas given above are exemplified by such compounds as dimethyl 5-sodiosulfo-1,4-cyclohexanedicarboxylate and 5-sodiosulfo-1,4-cyclohexanedicarboxylic acid. Other examples of useful alicyclic sulfonates include alicyclic sulfonates wherein M in the above formulas is $Na^+$, $Li^+$, $K^+$, $Cg^+$, $Mg^{++}$, $Ba^{++}$, $Ca^{++}$ and the like. The $Na^+$ and $Li^+$ ions are preferred.

Generally, amounts of about 0.1–1.0% by weight of the alicyclic sulfonate are sufficient although amounts up to about 5% may be used. It is preferred that about 0.3–0.7% by weight be used.

The modified polyethylene terephthalate of this invention is produced according to conventional procedures exemplified hereinafter. Generally, the process involves the well known two-stage process, involving an esterification or transesterification step, depending on the starting materials, followed by a polycondensation step with the reaction being done in a melt condition. Temperatures employed will ordinarily range from about 160° C. to about 300° C. The transesterification or esterification portion of this invention will normally be carried out at atmospheric pressure with the polycondensation stage being conducted under a reduced pressure. The difunctional or monofunctional sulfo-monomer may be added in amounts as described above directly to the reaction mixture from which the polyester is made.

The polyesters described herein are especially useful in the preparation of biaxially oriented containers such as beverage bottles. The preparation of the containers generally involves injection molding a "slug" or parison followed by blow molding the slug in a manner which results in biaxially orienting the article.

Biaxial orientation of the articles is useful to impart improved physical properties such as improved tensile strength and yield stresses. Biaxial orientation is accomplished by stretching the thermoplastic in the axial and hoop directions as the article is being formed, thus, the term "stretch-blow molding" is used herein. The article of the present invention is molecularly oriented by being biaxially stretched an average of up to 4.0 times in the axial direction and about 2.5 to 7.0 times in the hoop direction. The extent of the molecular orientation can be determined by known techniques. One method of determining molecular orientation is described in The Journal of Polymer Science, Vol. XLVII, pages 289–306 (1960), entitled "X-Ray Determination of the Crystallite Orientation Distribution of Polyethylene Terephthalate Films," by C. J. Heffelfinger and R. L. Burton; and "Structure And Properties of Oriented Poly(ethylene Terephthalate) Films," by Heffelfinger and Schmidt in the Journal of Applied Polymer Sciences, Vol. 9, page 2661 (1965).

Biaxial orientation provides excellent strength properties. Articles typically do not have the same degree of orientation at every point on the article; however, the areas that are less oriented have a thicker shell than the areas that are more highly oriented, thereby providing relatively high overall strength to the article. In preparing a bottle, the thinnest shell thickness occurs in the right cylinder section; however, this section is the most highly oriented.

The following examples are submitted for a better understanding of the invention.

EXAMPLE 1

A 100-mL one-neck flask is charged with 23.2 g (0.119 mol) dimethyl terephthalate, 0.16 g (0.0006 mol) dimethyl 5-sodiosulfo-1,3-cyclohexanedicarboxylate, 14.88 g (0.24 m) ethylene glycol, and 0.14 cc of tetraisopropyl titanate solution (1.67% Ti in n-butanol, 100 ppm Ti based on polymer). The flask is equipped with a head having a nitrogen inlet, a take-off to remove volatile materials, and socket joint to accommodate a stirrer. A stirrer shaft runs through the socket joint and has a ball joint attached by pressure tubing to the shaft to seal the socket joint.

The flask is swept with a slow stream of nitrogen, stirred, and immersed in a molten metal bath preheated to 200° C. Transesterification begins as soon as the flask contents reaches 200° C. The water and methanol evolved are swept by the nitrogen stream into a condensing system. Heating and stirring continues at 200° C. for one hour and 40 minutes and then the temperature of the bath is increased to 220° C. Stirring and heating continue for one hour at these conditions and then the temperature of the bath is increased to 285° C. At 285° C. the nitrogen inlet is closed and a vacuum pump is applied. Within five minutes, a pressure $\leq 0.5$ torr is attained. Stirring and heating under reduced pressure are continued for 30 minutes. At the end of this time, the polymer, which is clear and light yellow in color before crystallization, is removed from the bath, cooled, and recovered by breaking the flask. The polymer I.V. is 0.80, and mol % diethylene glycol is 3.0.

EXAMPLE 2

A 500-mL, one-neck flask is charged with 115.2 g (0.594 mol) dimethyl terephthalate, 1.4 g (0.006 mol)

3-sodiosulfocyclohexanecarboxylic acid, 74.4 g (1.2 mol) ethylene glycol, 0.69 ml of isopropyl titanate solution (1.36% Ti in n-butanol, 100 ppm Ti based on polymer). The remainder of the experiment is carried out as per Example 1 except the vacuum at ≦0.5 torr is held for 60 minutes to give a polymer with I.V. of 0.65 and mol % diethylene glycol of 2.5.

The following table shows that the cycloaliphatic ring compounds result in lower diethylene glycol contents than the aromatic compounds. Reaction conditions are generally the same as in Example 1. Examples 4 and 7 illustrate that when sodium acetate is present, the reaction rate is slower. Keeping all reaction conditions the same, the I.V.'s are lower for the polymers containing the sodium acetate.

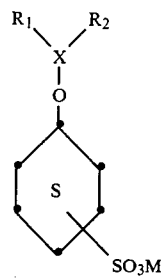

wherein $R_1$ is COOR and $R_2$ is H, alkyl from $C_1$–$C_8$ or COOR wherein R is H, alkyl from $C_1$–$C_8$ or O(CH$_2$-

Effect of Selected Na Sulfonate Compounds on Diethylene Glycol Formation in Polyethylene Terephthalate

| | Sulfonate | | Polymerization Conditions[1] | | | Polymer Properties | |
|---|---|---|---|---|---|---|---|
| Ex. | Type[2] | Mol % | NaOAc (0.1 mol/mole —SO$_3$) | Temp. (°C.) | Time (min) | I.V. | Mol % Diethylene Glycol |
| 3 (Control) | a | 0.5 | No | 275 | 60 | 0.60 | 15 |
| 4 (Control) | a | 0.5 | Yes | 275 | 90 | 0.56 | 2 |
| 5 | b | 0.5 | No | 285 | 33 | 0.80 | 3 |
| 6 | b | 0.5 | No | 285 | 25 | 0.68 | 3 |
| 7 | b | 0.5 | Yes | 285 | 35 | 0.68 | 2 |
| 8 (Control) | c | 1.0 | No | 285 | 60 | 0.58 | 4 |
| 9 | d | 1.0 | No | 285 | 60 | 0.65 | 2 |

[1]Pressure during polymerization ≦ 0.5 Torr
[2]a - dimethyl 5-sodiosulfoisophthalate
 b - dimethyl 5-sodiosulfo-1,3-cyclohexanedicarboxylate
 c - 3-sodiosulfobenzoic acid
 d - 3-sodiosulfocyclohexanecarboxylic acid The invention has been described in detail with particular reference to preferred embodiments thereof, but it will be understood that variations and modifications will be effected within the spirit and scope of the invention.

I claim:

1. A modified ethylene terephthalate copolymer having an improved planar stretch ratio at a given inherent viscosity and relatively low diethylene glycol content, said copolymer having repeat units from 100 mol % of a glycol component comprising at least 15 mol % ethylene glycol and from 100 mol % of a dicarboxylic acid component comprising at least 80 mol % terephthalic acid or an ester-forming derivative thereof and about 0.1–5.0 mol % of a compound having a structure selected from

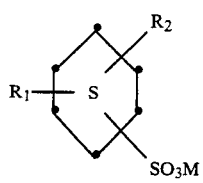

wherein $R_1$ is H, alkyl from $C_1$–$C_8$ or COOR, and $R_2$ is COOR wherein R is H, alkyl from $C_1$–$C_8$ or O(CH$_2$-)$_2$OH and )$_2$OH and M in each of the above formulas is an alkali or alkaline earth metal ion.

2. A modified ethylene terephthalate copolymer according to claim 1 wherein said glycol component comprises at least 85 mol % ethylene glycol.

3. A modified ethylene terephthalate copolymer according to claim 1 having an inherent viscosity of at least 0.55.

4. A modified ethylene terephthalate copolymer according to claim 1 derived essentially from terephthalic acid, at least 15 mol % ethylene glycol and up to 85 mol % 1,4-cyclohexanedimethanol.

5. A modified ethylene terephthalate copolymer having an improved planar stretch ratio at a given inherent viscosity and relatively low diethylene glycol content, said copolymer having repeat units from 100 mol % of a glycol component comprising at least 80 mol % ethylene glycol and from 100 mol % of a dicarboxylic acid component comprising at least 80 mol % terephthalic acid or an ester-forming derivative thereof and about 0.1–5.0 mol % of a compound having the structure

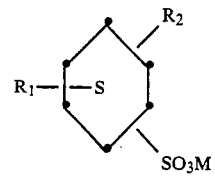

wherein $R_1$ is H, alkyl from $C_1$–$C_8$ or COOR and $R_2$ is COOR wherein R is H, alkyl from $C_1$–$C_8$ or O(CH$_2$-)$_2$OH and M in each of the above formulas is an alkali or alkaline earth metal ion.

6. A modified ethylene terephthalate copolymer having an improved planar stretch ratio at a given inherent viscosity and relatively low diethylene glycol content, said copolymer having repeat units from 100 mol % of a glycol component comprising at least 80 mol % ethylene glycol and from 100 mol % of a dicarboxylic acid component comprising at least 80 mol % terephthalic acid or an ester-forming derivative thereof and about 0.1–5.0 mol % of a compound having the structure

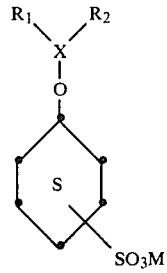

wherein $R_1$ is COOR and $R_2$ is H, alkyl from $C_1$–$C_8$ or COOR wherein R is H, alkyl from $C_1$–$C_8$ or $O(CH_2)_2OH$ and M is an alkali or alkaline earth metal ion.

7. A container having walls comprising the copolymer of claim 1.

* * * * *